(12) United States Patent
Vollbrecht et al.

(10) Patent No.: US 10,238,943 B2
(45) Date of Patent: Mar. 26, 2019

(54) MULTIPLE SENSOR TRACKING SYSTEM AND METHOD

(71) Applicant: FLYINGTEE TECH, LLC, Jenks, OK (US)

(72) Inventors: James Vollbrecht, Oklahoma City, OK (US); John Vollbrecht, Oklahoma City, OK (US); Ryan Tawwater, Oklahoma City, OK (US)

(73) Assignee: FLYINGTEE TECH, LLC, Jenks, OK (US)

( * ) Notice: Subject to any disclaimer, the term of this patent is extended or adjusted under 35 U.S.C. 154(b) by 0 days.

(21) Appl. No.: 14/876,569

(22) Filed: Oct. 6, 2015

(65) Prior Publication Data
US 2016/0074704 A1 Mar. 17, 2016

Related U.S. Application Data

(62) Division of application No. 14/475,199, filed on Sep. 2, 2014.

(51) Int. Cl.
*A63B 69/36* (2006.01)
*A63B 24/00* (2006.01)
(Continued)

(52) U.S. Cl.
CPC ...... *A63B 69/3691* (2013.01); *A63B 24/0003* (2013.01); *A63B 24/0021* (2013.01);
(Continued)

(58) Field of Classification Search
CPC .......... A63B 24/0021; A63B 2220/806; A63B 2220/807; A63B 69/3658; A63B 2024/0034; A63B 2024/0037
(Continued)

(56) References Cited

U.S. PATENT DOCUMENTS 3,712,624 A * 1/1973 Conklin ............. A63B 24/0021
473/152
4,137,566 A 1/1979 Haas et al.
(Continued)

FOREIGN PATENT DOCUMENTS

| JP | 2004-135908 A | 5/2004 |
| JP | 2007-101294 A | 4/2007 |

(Continued)

OTHER PUBLICATIONS

Chinese Patent Application No. 2017051700517490, SIPO First Office Action dated Sep. 21, 2018 (English).
(Continued)

*Primary Examiner* — Mark Graham
(74) *Attorney, Agent, or Firm* — Crowe & Dunlevy, P.C.

(57) ABSTRACT

A system and method for tracking the flight of golf balls at driving range. The system includes a plurality of hitting stations, a plurality of sensors, a computer, and a range surface. Each hitting station in the plurality of hitting stations includes a golf ball, a golf club, a monitor, and a sensor. At least one other sensor in the plurality of sensors is placed outside a hitting station. The flight path of the golf balls being calculated by the computer using parameters by the plurality of sensors. The method includes steps for determining whether a first sensor detected a first parameter and a second parameter, whether a second sensor detected a first and a second parameter, whether a third sensor detected a third parameter, and depicting the flight path of the golf balls using the first parameter, the second parameter, and the third parameter.

25 Claims, 5 Drawing Sheets

(51) Int. Cl.
*A63B 71/06* (2006.01)
*G01S 13/58* (2006.01)
*G01S 13/86* (2006.01)
*G01S 13/88* (2006.01)
*G01S 13/72* (2006.01)

(52) U.S. Cl.
CPC .......... *A63B 69/36* (2013.01); *A63B 69/3694* (2013.01); *A63B 71/0619* (2013.01); *A63B 71/0622* (2013.01); *G01S 13/58* (2013.01); *G01S 13/72* (2013.01); *G01S 13/867* (2013.01); *G01S 13/88* (2013.01); *A63B 2024/004* (2013.01); *A63B 2024/0031* (2013.01); *A63B 2024/0034* (2013.01); *A63B 2024/0053* (2013.01); *A63B 2071/0647* (2013.01); *A63B 2071/0658* (2013.01); *A63B 2208/0204* (2013.01); *A63B 2220/10* (2013.01); *A63B 2220/12* (2013.01); *A63B 2220/30* (2013.01); *A63B 2220/35* (2013.01); *A63B 2220/53* (2013.01); *A63B 2220/805* (2013.01); *A63B 2220/806* (2013.01); *A63B 2220/808* (2013.01)

(58) Field of Classification Search
USPC .......................................... 473/168, 150–156
See application file for complete search history.

(56) References Cited

U.S. PATENT DOCUMENTS

| | | | |
|---|---|---|---|
| 4,283,056 A * | 8/1981 | Miller | A63B 69/3697 473/151 |
| 4,673,183 A | 6/1987 | Trahan | |
| 5,092,602 A | 3/1992 | Witler et al. | |
| 5,150,895 A | 9/1992 | Berger | |
| 5,246,232 A | 9/1993 | Eccher et al. | |
| 5,290,037 A | 3/1994 | Witler et al. | |
| 5,303,924 A | 4/1994 | Kluttz et al. | |
| 5,342,051 A | 8/1994 | Rankin et al. | |
| 5,375,832 A | 12/1994 | Witler et al. | |
| 5,398,936 A | 3/1995 | Kluttz et al. | |
| 5,401,026 A | 3/1995 | Eccher et al. | |
| 5,413,345 A | 5/1995 | Nauck | |
| 5,486,002 A | 1/1996 | Witler et al. | |
| 5,489,099 A | 2/1996 | Rankin et al. | |
| 5,653,642 A | 8/1997 | Bonacorsi | |
| 5,700,204 A | 12/1997 | Teder | |
| 5,743,815 A | 4/1998 | Helderman | |
| 5,820,496 A | 10/1998 | Bergeron | |
| 5,879,246 A | 3/1999 | Gebhardt et al. | |
| 5,938,545 A * | 8/1999 | Cooper | A63B 69/3658 473/407 |
| 6,012,987 A | 1/2000 | Nation | |
| 6,179,720 B1 | 1/2001 | Rankin et al. | |
| 6,304,665 B1 | 10/2001 | Cavallaro et al. | |
| 6,320,173 B1 | 11/2001 | Vock et al. | |
| 6,322,455 B1 | 11/2001 | Howey | |
| 6,371,862 B1 | 4/2002 | Reda | |
| 6,373,508 B1 | 4/2002 | Moengen | |
| 6,437,559 B1 | 8/2002 | Zajac et al. | |
| 6,520,864 B1 * | 2/2003 | Wilk | A63B 24/0006 473/152 |
| 6,547,671 B1 | 4/2003 | Mihran | |
| 6,607,123 B1 | 8/2003 | Jollifee et al. | |
| 6,702,292 B2 | 3/2004 | Takowsky | |
| 6,764,412 B2 | 7/2004 | Gobush et al. | |
| 6,781,621 B1 | 8/2004 | Gobush et al. | |
| 6,898,971 B2 | 5/2005 | Dilz, Jr. | |
| 6,905,339 B2 | 6/2005 | DiMare et al. | |
| 6,974,391 B2 | 12/2005 | Ainsworth et al. | |
| 6,998,965 B1 | 2/2006 | Luciano, Jr. et al. | |
| 7,040,998 B2 | 5/2006 | Jolliffe et al. | |
| 7,052,391 B1 | 5/2006 | Luciano, Jr. | |
| 7,059,974 B1 | 6/2006 | Golliffe et al. | |
| 7,094,164 B2 | 8/2006 | Marty et al. | |
| 7,095,312 B2 | 8/2006 | Erario et al. | |
| 7,143,639 B2 | 12/2006 | Gobush | |
| 7,160,196 B2 | 1/2007 | Thirkettle et al. | |
| 7,214,138 B1 | 5/2007 | Stivers et al. | |
| 7,223,169 B2 | 5/2007 | Imaeda et al. | |
| 7,317,388 B2 | 1/2008 | Kawabe et al. | |
| 7,321,330 B2 | 1/2008 | Sajima | |
| 7,337,965 B2 | 3/2008 | Thirkettle et al. | |
| 7,344,446 B2 | 3/2008 | Wyeth | |
| 7,497,780 B2 | 3/2009 | Kiraly | |
| 7,641,565 B2 | 1/2010 | Kiraly | |
| 7,787,886 B2 | 8/2010 | Markhovsky et al. | |
| 7,815,516 B1 | 10/2010 | Mortimer et al. | |
| 7,822,424 B2 | 10/2010 | Markhovsky et al. | |
| 7,837,572 B2 | 11/2010 | Bissonnette et al. | |
| 7,843,429 B2 | 11/2010 | Pryor | |
| 7,854,669 B2 | 12/2010 | Marty et al. | |
| 8,018,375 B1 | 9/2011 | Alexopoulos et al. | |
| 8,068,095 B2 | 11/2011 | Pryor | |
| 8,077,917 B2 | 12/2011 | Forsgren | |
| 8,113,964 B2 | 2/2012 | Lindsay | |
| 8,142,302 B2 | 3/2012 | Balardeta et al. | |
| 8,257,189 B2 | 9/2012 | Koudele et al. | |
| 8,328,653 B2 | 12/2012 | Lock | |
| 8,335,345 B2 | 12/2012 | White et al. | |
| 8,400,346 B2 | 3/2013 | Hubbard et al. | |
| 8,409,024 B2 | 4/2013 | Marty et al. | |
| 8,912,945 B2 * | 12/2014 | Tuxen | G01S 13/58 342/104 |
| 8,948,457 B2 * | 2/2015 | Marty | G06T 7/2033 382/103 |
| 2002/0107078 A1 * | 8/2002 | Collins | A63B 24/0021 473/152 |
| 2005/0012023 A1 * | 1/2005 | Vock | A63B 24/0003 250/206.1 |
| 2005/0227792 A1 | 10/2005 | McCreary et al. | |
| 2007/0167247 A1 * | 7/2007 | Lindsay | A63B 24/0021 473/131 |
| 2007/0293331 A1 | 12/2007 | Tuxen | |
| 2008/0021651 A1 * | 1/2008 | Seeley | A63B 24/0021 702/3 |
| 2008/0039222 A1 * | 2/2008 | Kiraly | A63B 24/0003 473/131 |
| 2008/0139330 A1 | 6/2008 | Tuxen | |
| 2008/0261711 A1 | 10/2008 | Tuxen | |
| 2009/0036237 A1 | 2/2009 | Nipper et al. | |
| 2009/0253526 A1 * | 10/2009 | Koudele | A63B 43/00 473/155 |
| 2009/0295624 A1 | 12/2009 | Tuxen | |
| 2011/0286632 A1 | 11/2011 | Tuxen et al. | |
| 2012/0008825 A1 * | 1/2012 | Casamona | G06T 17/00 382/103 |
| 2012/0068879 A1 | 3/2012 | Tuxen | |
| 2013/0039538 A1 | 2/2013 | Johnson et al. | |
| 2013/0184089 A1 * | 7/2013 | Rauchholz | A63B 67/02 473/168 |
| 2013/0274025 A1 * | 10/2013 | Luciano, Jr. | A63B 69/3658 473/156 |

FOREIGN PATENT DOCUMENTS

| | | |
|---|---|---|
| JP | 2012-231908 A | 11/2012 |
| WO | 92/09337 | 6/1992 |
| WO | WO2005035076 A2 | 4/2005 |
| WO | WO2006002640 A1 | 1/2006 |

OTHER PUBLICATIONS

Chinese Patent Application No. 2017051700517490, SIPO First Office Action dated Sep. 21, 2018 (Chinese).
European Application No. 14901129.8, Extended European Search Report dated May 11, 2018.

* cited by examiner

MULTIPLE SENSOR TRACKING SYSTEM AND METHOD

PRIORITY CLAIM

This U.S. Non Provisional Patent Application claims priority from, and is a divisional of, U.S. patent application Ser. No. 14/475,199, filed on Sep. 2, 2014 with the same title and inventors as the present application.

FIELD OF THE INVENTION

This invention relates generally to the field of tracking golf balls, and more particularly, but not by way of limitation, to systems for using a plurality of sensors to facilitate the depiction of that path on a display.

BACKGROUND OF THE INVENTION

The game of golf has remained a popular hobby and recreational activity since it was invented several centuries ago. Part of the popularity of golf comes from pursuing mastery of its various skills. Improving such skills requires frequent and consistent practice. Driving ranges are common venues used for such practice. At typical driving ranges, golfers can practice their swing. Recently, businesses have begun to open more advanced driving ranges intended to cater to the golfers' desires for other forms of entertainment and recreation. Such facilities include not only the typical driving range, but also restaurants, bars, and other entertainment options with which the golfer may choose to supplement their practice round. On such option is the inclusion of various virtual games related to the golf swing, such as those disclosed in U.S. application Ser. No. 14/321,333, the disclosure of which is hereby incorporated by reference.

In parallel to the appearance of such new golfing/entertainment facilities, various technologies have been employed to assist golfers in improving their game or enhancing the typical practice round. Such technologies include using rf chips, radar, lasers, or optical cameras to track the golfer's swing and the flight path of the golf ball, and to provide the golfer with useful feedback regarding both. Unfortunately, while each such technology is well-suited for tracking particular parameters of the golf swing or path of the golf ball, none is capable of uninterrupted tracking and providing the golfer with a comprehensive view of their swing and the resulting golf shot. Accordingly, there is a need for a system and method to utilize the parameters captured by each such technology across a plurality of sensors and present the resulting information in a meaningful manner to the golfer. It is to this and other restrictions in the prior art that the present invention is directed.

BRIEF SUMMARY OF THE INVENTION

In the preferred embodiments, the a driving range includes a golf ball, a golf club, a hitting station, a range surface, a plurality of sensors, a computer, and a display. Each of the plurality of sensors is configured to detect at least one parameter related to the golf swing or flight path of the golf ball. Additionally, each sensor in the plurality of sensors is connected to the computer. The computer includes a processor and a database. The database is configured to store parameters related to the hitting station, each of the sensors in the plurality of sensors, the range surface, and the golf club. In addition, the database is configured to store the parameters detected by each of the sensors in the plurality of the sensors. Finally, the database is configured to store rules and methods that can be used to determine which sensor's parameters should be used to depict the golf swing and the flight path on the display. All parameters and rules stored in the database are stored in a manner that allows them to be retrieved and processed as needed by the processor.

DETAILED DESCRIPTION OF THE INVENTION

Figure 1:
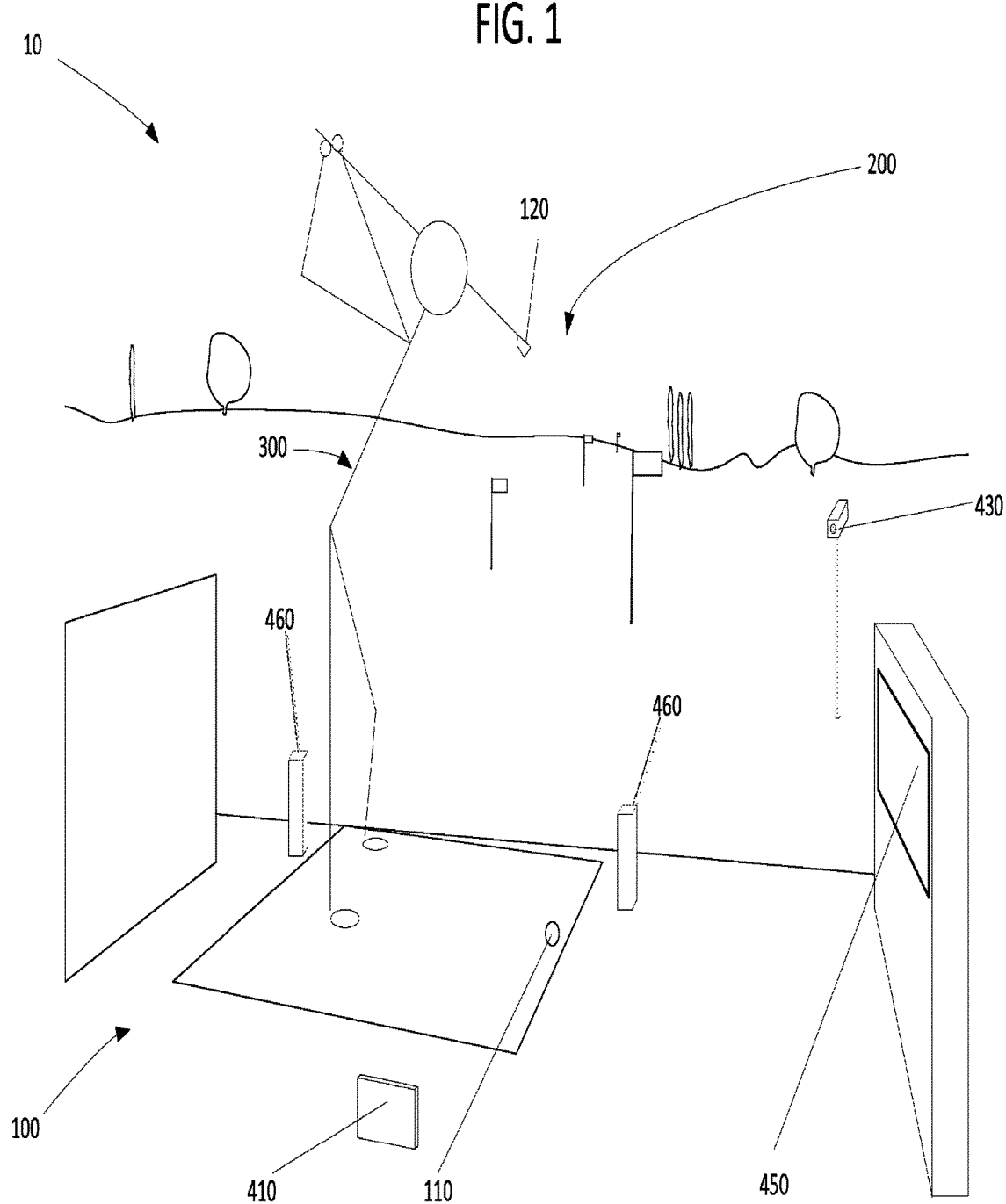
FIG. 1 shows a back perspective view of a first embodiment of a multiple sensor tracking system at a driving range.
Figure 2:
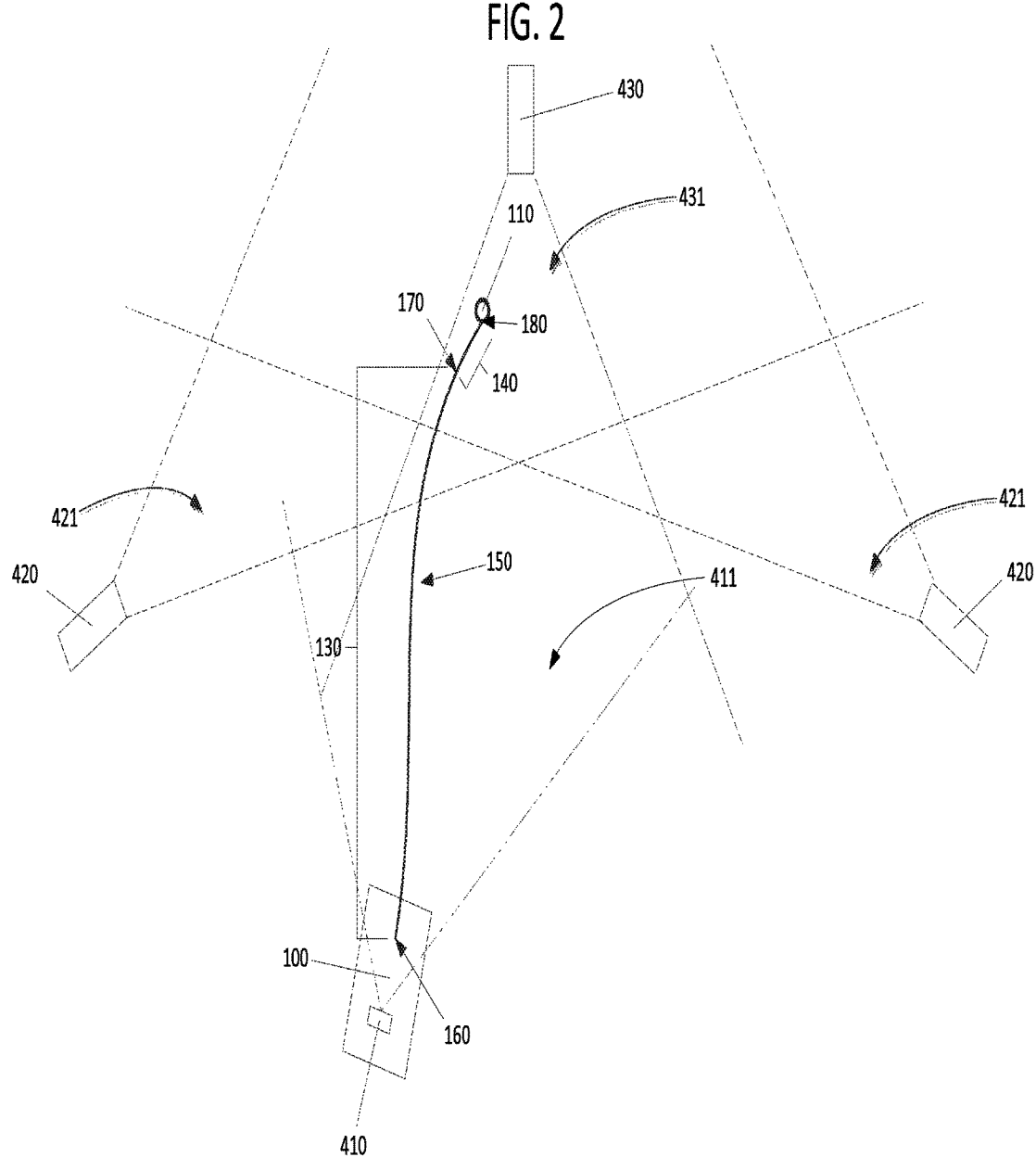
FIG. 2 shows an overhead view of a first embodiment of a multiple sensor tracking system at a driving range.
Figure 3:
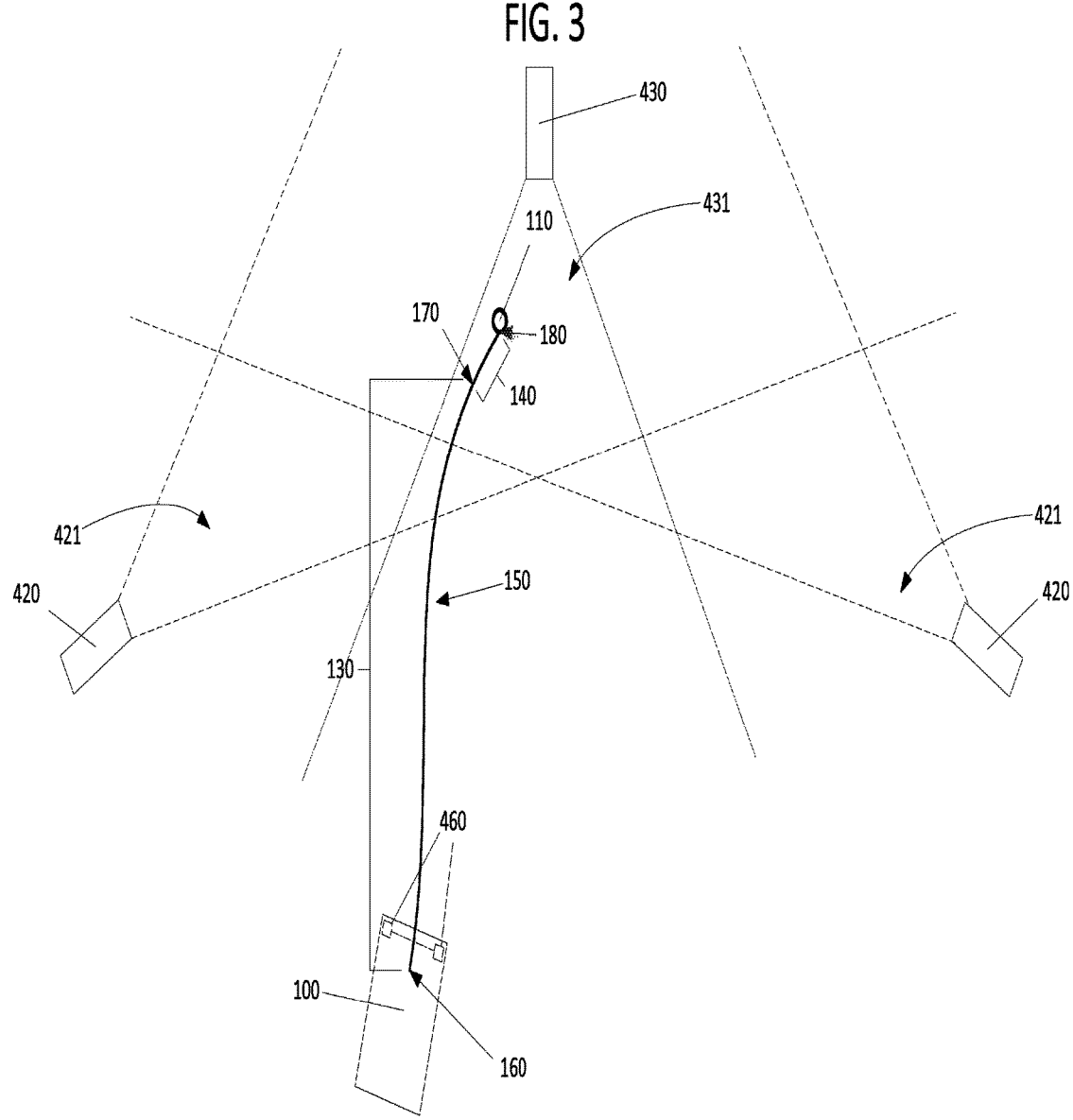
FIG. 3 shows an overhead view of a second embodiment of a multiple sensor tracking system at a driving range.

FIG. 1 shows a driving range 10 that includes at least one hitting station 100, at least one golf ball 110, at least one golf club 120, and a range surface 200. The hitting station 100 is positioned at one end of the range surface 200. It will be understood that a player 300 standing in the hitting station 100 may swing the golf club 120 to hit the golf ball 110 over and onto the range surface 200. Turning to FIG. 2, shown therein is the path that the golf ball 110 travels from the point of impact with the golf club 120 (referred to as the origination point 160) to the point that the golf ball 110 initially impacts the range surface 200 (referred to as the impact point 170). The path the golf ball 110 travel from the origination point 160 to the impact point 170 is referred to as the flight path 130. The path that the golf ball 110 travels from the impact point 170 to the point it comes to rest on the range surface 200 (referred to as the resting point 180) is referred to as the ground path 140. The total travel path 150 refers to the complete path that the golf ball 110 travels after the origination point 150 to the resting point 180, and is equivalent to the combination of the flight path 130 and the ground path 140. FIGS. 2 and 3 depict the flight path 130, ground path 140 and total travel path 150 of a golf ball 110.

Turning back to FIGS. 1 and 2, in accordance with a preferred embodiment of the present invention, therein depicted is a preferred embodiment of a multiple sensor tracking system specially configured to track the total travel path 150 of the golf balls 110 used at a driving range 10 and to display that total travel path 150 to the player 300. The multiple sensor tracking system preferably includes a plurality of sensors 410, 420, and 430, a display 450, and a computer having a processor and a database.

Each sensor in the plurality of sensors is configured to record certain parameters about the total travel path 150. Such parameters may include, without any limitation, the detection of the moment of impact, the origination point 150, the launch angle of the flight path 130, side spin of the golf ball 110, vertical spin of the golf ball 110, initial location of the golf ball 110, the impact point 160, speed/velocity of the golf ball 100 on the flight path 130, the three-dimensional coordinates of the flight path 130, the three-dimensional coordinates of the ground path 140, and the resting point 180. In addition, certain sensors may be configured to detect other parameters related to the golf swing of the player 300, including but not limited to the club path and the club speed/velocity.

It will be understood that by those skilled in the art that there are numerous types of sensors and technologies available for the detection of parameters, including for example and without limitation, infrared beam sensors, radar sensors, pressure sensors, sound sensors, laser sensors, and cameras (both infrared and visible light). It will be further understood that certain sensors are capable of detecting a subset of the total parameters available about the total travel path 150. For example, infrared beam sensors are particularly well-suited for detecting the moment of impact, but are not able to detect or otherwise determine the side spin of the golf ball 110, the impact point 170, or other similar parameters. In contrast, sophisticated camera sensors are available that are well-suited to determine the parameters related to the flight path 130, such as direction, speed and the impact point 170, but are not as accurate at determining parameters associated with the ground path 140, such as the resting point 180. By way of further example, radar sensors are particularly well suited to detect the side spin and vertical spin of the golf ball 110 on the initial flight path 130, as well as the club path and club head speed, but unable to determine parameters associated with the ground path 140.

In addition to being configured to detect certain parameters, each sensor type also has a field of detection. The field of detection is the general area in front of the sensor from which the sensor can detect parameters. It will be understood that the field of detection can be adjusted for each sensor type, but may be restrained by the particular technology used to detect parameters. Furthermore, the position of each sensor may affect its field of detection. For example, FIG. 2 depicts a sensor 410 positioned in the back of a hitting station 100, with a field of detection 411. In such a position the sensor's 410 view of the flight path 130 can be obscured by the golfer, or the divisions between each of the hitting stations 100. Such obstructions often adversely impact a sensor's ability to detect parameters.

A key improvement of the invention is the placement of other sensors in the plurality of sensors such that their respective fields of detection 411, 421, and 431 are not similarly obstructed. It will be therefore understood that such placements can thereby ensure a high probability that the combined fields of detection 411, 421, and 431 provide for an uninterrupted view of the total travel path (150). For example, in the preferred embodiment depicted in FIG. 2, the fields of detection 411, 421 and 431 for each of the sensors 410, 420 and 430 respectively are shown to overlap, yet cover different areas where the golf ball 110 might travel on the total travel path 150.

Figure 4:
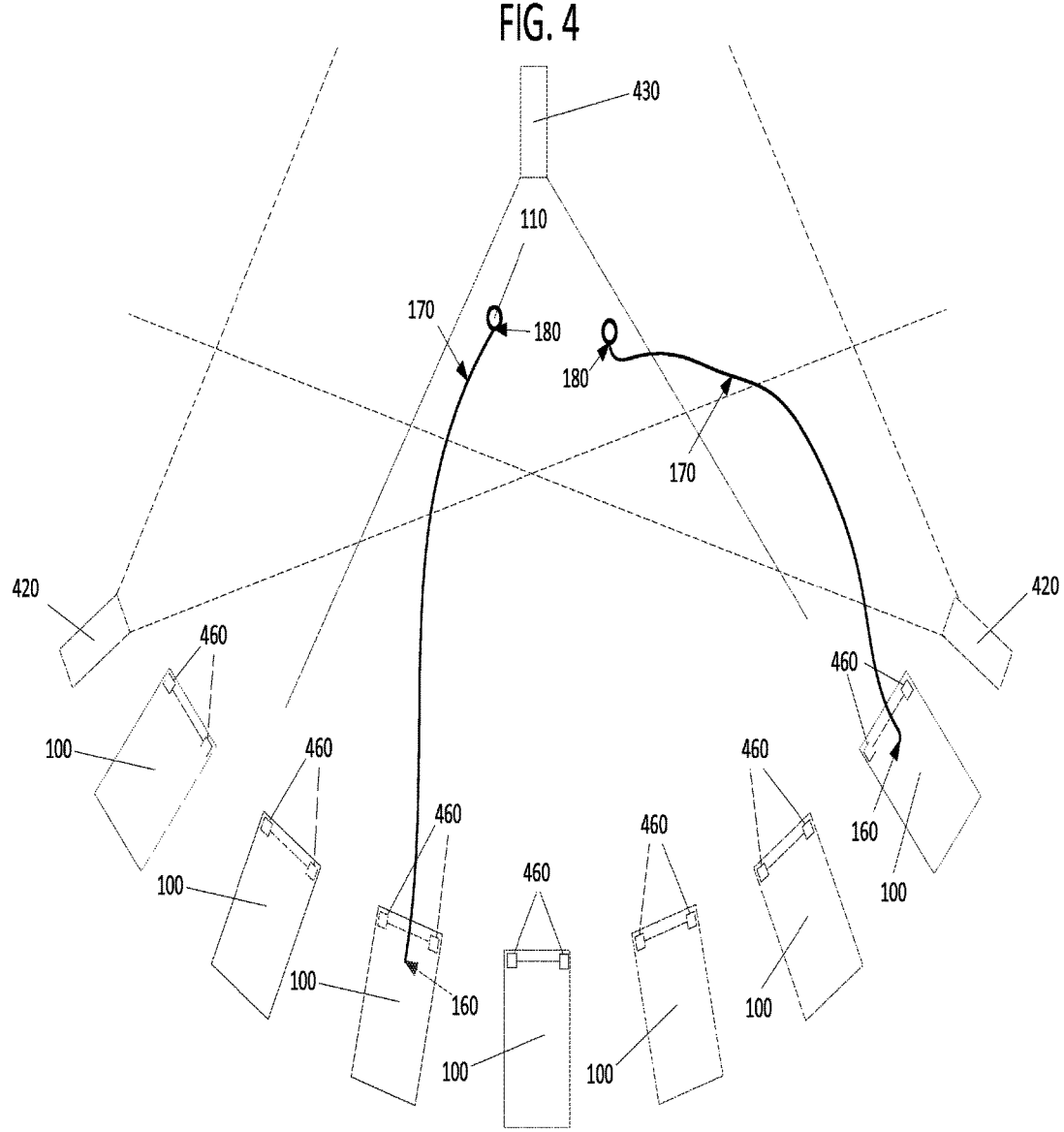
FIG. 4 shows an overhead view of a second embodiment of a multiple sensor tracking system with a plurality of a hitting stations.

It will be understood that numerous embodiments of the multiple-sensor tracking system are possible by including different types of sensors 410, 420, 430 in the plurality of sensors, and positioning those sensors at different places within the driving range 10. FIG. 2 depicts one such preferred embodiment. It will be further understood that a driving range 10 may include a plurality of hitting stations 100 arranged in a curve around an end of the range surface 200, as depicted in FIG. 4. A first-type sensor 410 is positioned at the back of each of the hitting stations 100. In this embodiment, the first-type sensor 410 uses radar to detect club path, club face angle, launch angle, side spin, vertical spin and initial velocity. A second-type sensor 430 is positioned at another end of the range surface 200, and is generally positioned to face a plurality of hitting stations 110, as shown in FIG. 4. The second-type sensor 430 has a narrower field of detection 431 and is thus used to detect parameters related to the ground path 140. In this embodiment, the second-type sensor uses narrow-angle cameras to detect the three-dimensional coordinates of the ground path 140 and the speed/velocity of the golf ball 110. It will be understood that while only one sensor 430 is depicted in this embodiment, several second-type sensors 430 could be used in combination to detect parameters for ground paths 150 that occur in different places on the range surface 200.

In the depicted embodiment, two third-type sensors 430 are positioned at opposite ends of the plurality of hitting stations 100. The third-type sensors are configured to face inwards towards the range surface 200 and have overlapping fields of detection 421. Such overlapping fields of detections 421 are either necessary for certain types of sensors, or can be optionally employed to improve the accuracy of the detected parameters.

Turning to FIGS. 3 and 4, depicted therein are alternate preferred embodiments of the multiple-sensor tracking system wherein the first-type sensors 410 of the first preferred embodiment depicted in FIGS. 1 and 2 have been replaced with a fourth-type sensor 460. It will be understood that in the depicted alternative preferred embodiments, the fourth-type sensor 460 is configured to be a simple infrared directional trip sensor. Such sensor 460 includes a beam emitter and a beam detector positioned on opposite sides of the hitting station 100. In the simplest embodiment, the beam emitted of sensor 460 sends an infrared light beam to the other side of the hitting station 100 where it is detected by the beam detector. It will be further understood that when the golf ball 110 is hit it will travel between the beam detector and the beam emitter of sensor 460, and will thereby interrupt the infrared light beam being detected by the beam detector. In this manner, sensor 460 is able to identify when the flight path 130 begins, but is unable to detect other more advanced parameters associated with the total travel path 150.

The database of the computer stores all parameters necessary for the multiple-sensor tracking system, which may include the size, shape and location of the hitting station, the location of each of the sensors in the plurality of sensors, the parameters that each of the sensors in the plurality of sensors can detect, the location and boundaries of the range surface 200, and the number, expected distance and trajectory of shots hit with the selected golf club 120. Such parameters are retrieved by the processor as needed to operate the multiple-sensor tracking system.

Figure 5:
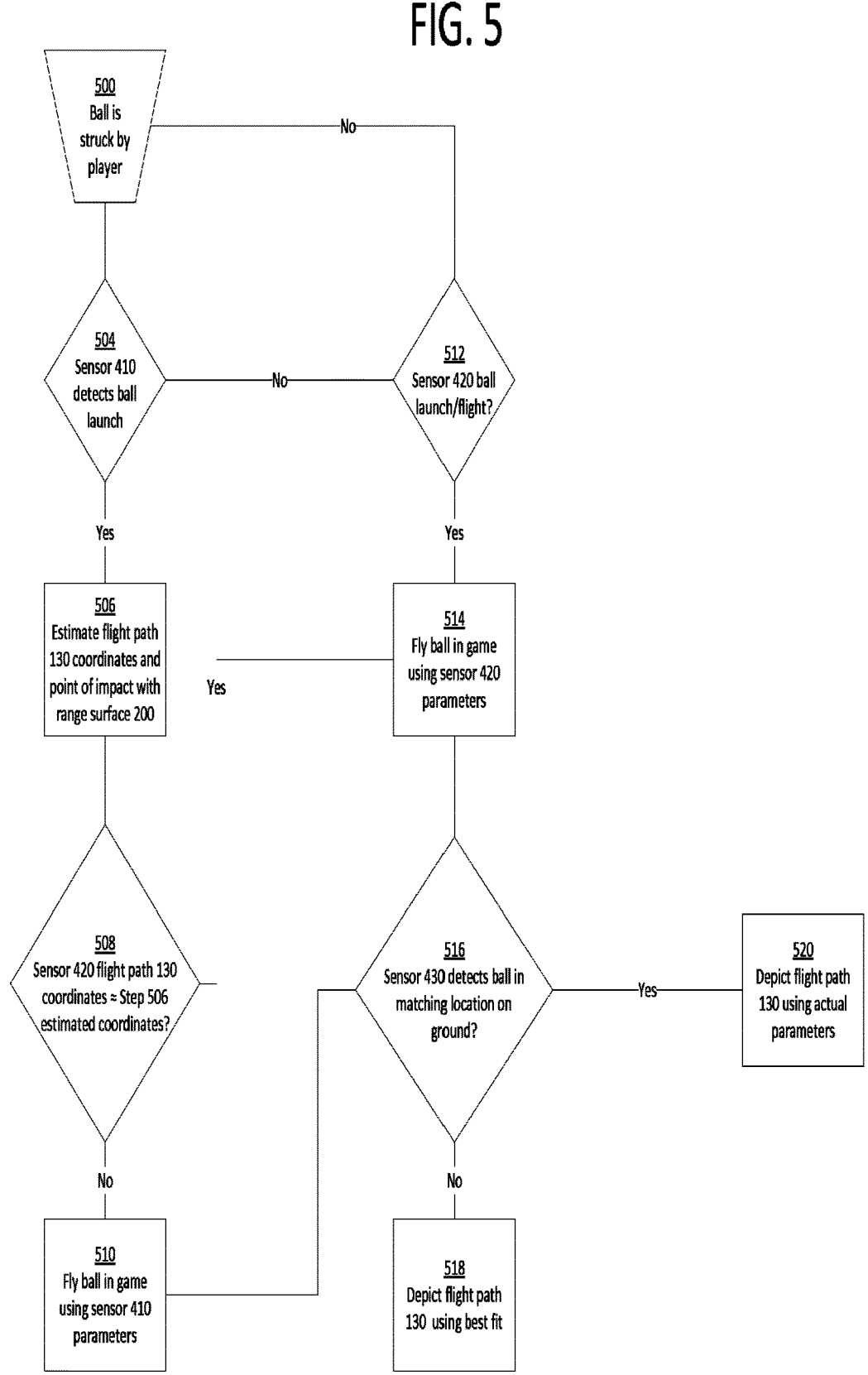
FIG. 5 is a flow chart depicting a method of determining which parameters should be used to depict a travel path.

It will be understood that by using multiple sensors 410, 420, and 430 (or alternatively 460, 420 and 430), the multiple-sensor tracking system is able to capture certain desired parameters of the total travel path 150. Because the sensors 410, 420 and 430 may detect the same parameters, a method is necessary to determine which parameters should be chosen to depict the total travel path 150 on the display 450. FIG. 5 depicts a method for making such determinations.

The method of FIG. 5 begins in step 500 when the golf ball 110 is struck by the golf club 120. The moment of impact is potentially detected by sensor 410 in step 504 (or alternatively by sensor 460 as described above). If sensor 410 detects the moment of impact, processing is transferred to step 506. In step 506, the computer uses the launch angle, initial velocity and origination position to estimate three-dimensional coordinates of the flight path 130 and an estimated impact point 170. In the first preferred embodiment, the launch angle, initial velocity and origination position are all parameters that can be detected by sensor 410. Processing is then passed to step 508.

The purpose of step 508 is to determine if the sensors 420 have detected a golf shot that corresponds to the golf shot that was detected by the sensor 410 from step 504. This is done by comparing the estimated three-dimensional parameters from step 506 with the actual three-dimensional parameters detected by the sensors 420. It will be understood that in the typical driving range 10 there may be several different golf shots being tracked at any given time, such as those depicted in FIG. 4. In the preferred embodiment, sensors 420 may detect actual three-dimensional parameters for many if not each flight path 130 associated with each such golf shot. Accordingly, in step 508, the computer first collects the actual three-dimensional parameters associated with each flight path 130 that was detected by sensors 420 during the time window when sensor 410 captured the parameters that were processed in step 506. The particular duration of the time window may depend on the types of sensors used, the weather conditions, the particular arrangement of the plurality of the hitting stations 100 on the driving range 10, the size and shape of the range surface, the positioning of the plurality of sensors, or any other condition that might effect the amount of time that a golf ball 110 could be expected to travel in each of the respective fields of detection 411, 421, 431. After capturing the actual three-dimensional parameters of the flight path 130 for the appropriate time window, the computer then compares such actual three-dimensional parameters for each flight path 130 with the estimated three-dimensional coordinates of flight path 130 and determines if any of the actual three-dimensional parameters correspond to the estimated three-dimensional parameters.

Such correspondence may be immediately apparent because the actual three-dimensional coordinates overlap a portion of the estimated three-dimensional coordinates. Alternatively, where the actual three-dimensional coordinates do not begin with actual origination position, the computer can calculate an estimated origination position 160 by extrapolating the three-dimensional parameters of the flight path 130 backwards. The estimated origination positions 160 (and actual origination positions 160 detected by the sensors 420 to the extent they exist) for each of the flight paths 130 are then compared to the actual origination position 160 detected by the sensor 410. If a corresponding actual/estimated origination position 160 detected by sensors 420 is found for the actual origination position 160 detected by sensor 410 is found, then processing proceeds to step 510. If no corresponding actual/estimated origination position 160 is detected by sensors 420, then processing proceeds to step 514.

In step 514 the flight path 130 is depicted on the display 450 using the three-dimensional parameters detected by sensor 420. In step 510 the flight path 130 is depicted on the display 450 using the three-dimensional parameters detected by sensor 410, or where sensor 410 did not detect three-dimensional parameters for the entire flight path 130, the computer will estimate any missing three-dimensional parameters by extrapolating the detected three-dimensional parameters along a parabolic curve.

Processing is then transferred to step 516 wherein sensor 430 potentially detects parameters associated with the ground path 140 of the golf ball 120. If sensor 430 detects parameters associated with the ground path 140, then in step 520, the total travel path 150 is depicted as continuing from the depicted flight path 130 using the parameters for the ground path 140 detected by sensor 430. It will be understood that in a typical driving range 10, sensor 430 may detect parameters for the ground path 140 of many different golf shots (as shown in FIG. 4). Accordingly, in step 516 the computer will attempt to align the parameters for the ground path 140 with the corresponding flight path 130. This is accomplished by taking the three-dimensional parameters used to depict the flight path 130 and calculating an estimated impact point 170. If sensor 430 detects parameters for the ground path 140 that correspond to the estimated point of impact, then processing proceeds to step 520. If sensor 430 does not detect parameters that correspond to the estimated impact point 170, then processing proceeds to step 518.

In step 518, the computer calculates parameters for the ground path 140 and depicts that ground path 130 on the display 450. This calculation is done by using the parameters used to depict the flight path 130, which may include an actual/estimated speed/velocity and direction as well as parameters that describe the effect of the friction between the range surface 200 and the golf ball 130. In step 520, the ground path 130 is depicted on the display 450 using the actual parameters for the ground path 130 that were detected by sensor 430.

If sensor 410 fails to detect the moment of impact in step 504, then processing moves to step 512 wherein sensor 420 potentially detects parameters associated with the flight path 130. If sensor 410 fails to detect the moment of impact, but sensor 420 detects parameters associated with the flight path 130, then processing is transferred to step 514. If sensor 410 fails to detect the moment of impact and sensor 420 fails to detect any parameters associated with the flight path 130, then processing returns back to step 500.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

We claim:

1. A method of detecting and depicting a total travel path of a golf ball hit from a hitting station in a plurality of hitting stations at a driving range, the method comprising the steps of:

detecting a first parameter associated with said total travel path of said golf ball using at least one sensor in a plurality of sensors, wherein said first parameter is a moment of impact of said golf ball;

transmitting said first parameter from said at least one sensor in said plurality of sensors to a computer having a processor;

determining, using said computer in electronic communication with a first sensor of said least one sensor in said plurality of sensors; said first sensor having a first sensor type and a first field of detection, whether said first sensor detects said first parameter associated with the total travel path of said golf ball hit, wherein said first field of detection has a substantially unobstructed view of said moment of impact of said golf ball;

determining, using said computer in electronic communication with a second sensor of said least one sensor in said plurality of sensors; said second sensor having a second sensor type that is different from the first sensor type and a second field of detection that is different from the first field of detection, whether said second sensor detects the first parameter associated with the total travel path, wherein said second field of detection has a substantially unobstructed view of a flight path of said golf ball;

detecting a second parameter associated with said total travel path of said golf ball using said second sensor, wherein said second parameter is said flight path of said golf ball;

transmitting said second parameter from said second sensor to said computer;

determining, using said computer, whether said second sensor detects the second parameter associated with the total travel path;

evaluating, using said computer, both said first sensor and said second sensor to determine whether to use said first parameter or said second parameter when both said first parameter and said second parameter are available;

calculating, using said computer, the total travel path of said golf ball using the first parameter detected by the first sensor and said second parameter detected by the second sensor when both the first sensor and the second sensor detect the first parameter; and depicting on a display in electronic communication with said computer the calculated total travel path of said golf ball hit from said hitting station at said driving range.

2. The method of claim 1 wherein the second parameter detected by the second sensor is used to depict said flight path of the golf ball.

3. The method of claim 2 wherein the method further comprises:
determining whether a third sensor in the plurality of sensors detects a third parameter associated with the total travel path.

4. The method of claim 3, wherein a ground path is depicted using the third parameter.

5. The method of claim 3, wherein the third parameter is the velocity, speed, direction, friction or a combination thereof of the golf ball after an impact point.

6. The method of claim 1 wherein the first parameter comprises golf ball data, club data or a combination thereof.

7. The method of claim 6 wherein said golf ball data and said club data comprise club head path, club face angle, club head speed, golf ball launch angle, golf ball side spin, golf ball vertical spin, golf ball initial velocity or a combination thereof.

8. The method of claim 1 wherein the second parameter comprises shot trajectory data.

9. A method of detecting and depicting a total travel path of a golf ball hit from a hitting station in a plurality of hitting stations at a driving range, the method comprising the steps of:
detecting a first parameter from at least one sensor in a plurality of sensors; said plurality of sensors in electronic communication with a computer having a processor;
determining, using said computer in electronic communication with a first sensor of said least one sensor in said plurality of sensors; said first sensor having a first sensor type, whether said first sensor detects said first parameter associated with the total travel path of said golf ball hit;
determining, using said computer in electronic communication with a second sensor of said least one sensor in said plurality of sensors; said second sensor having a second sensor type, whether said second sensor detects the first parameter associated with the total travel path;
detecting a second parameter associated with said total travel path of said golf ball using at least one of said sensors in said plurality of sensors;
determining, using said computer, whether the first sensor detects said second parameter associated with the total travel path;
determining, using said computer, whether said second sensor detects the second parameter associated with the total travel path;
evaluating, using said computer, both said first sensor and said second sensor to determine whether to use said first parameter or said second plurality parameter when both said first parameter and said second parameter are available;
calculating, using said computer, the total travel path of said golf ball using the first parameter and second parameter detected by the second sensor when both the first sensor and the second sensor detect the first parameter, but the first sensor does not detect the second parameter; and
depicting on a display in electronic communication with said computer the calculated total travel path hit from said hitting station at said driving range.

10. The method of claim 9 wherein the first parameter detected by the first sensor is used to depict a flight path when both the first sensor in the plurality of sensors and the second sensor in the plurality of sensors detected the second parameter.

11. The method of claim 9 wherein the method further comprises the step of determining whether a third sensor in the plurality of sensors detects a third parameter associated with the total travel path.

12. The method of claim 11, wherein a ground path is depicted using the third parameter.

13. The method of claim 12, wherein the third parameter is the velocity, speed, direction, friction or a combination thereof of the golf ball after an impact point.

14. The method of claim 9 wherein the first parameter comprises golf ball data, club data or a combination thereof.

15. The method of claim 14 wherein said golf ball data and said club data comprise club head path, club face angle, club head speed, golf ball launch angle, golf ball side spin, golf ball vertical spin, golf ball initial velocity or a combination thereof.

16. The method of claim 9 wherein the second parameter comprises shot trajectory data.

17. The method of claim 9 further comprising:
said first sensor having a first field of detection, and said first field of detection having a substantially unobstructed view of said moment of impact of said golf ball; and
said second sensor having said second sensor type that is different from said first sensor type and a second field of detection that is different from said first field of detection, and said second field of detection has a substantially unobstructed view of a flight path of said golf ball.

18. A method of detecting and depicting a total travel path of a golf ball hit from a hitting station in a plurality of hitting stations at a driving range, the method comprising the steps of:

- detecting a first parameter from at least one sensor in a plurality of sensors; said plurality of sensors in electronic communication with a computer having a processor;
- determining, using said computer in electronic communication with a first sensor of said least one sensor in said plurality of sensors; said first sensor having a first sensor type, whether said first sensor detects said first parameter associated with the total travel path of said golf ball hit;
- determining, using said computer in electronic communication with a second sensor of said least one sensor in said plurality of sensors; said second sensor having a second sensor type, whether said second sensor detects the first parameter associated with the total travel path;
- detecting a second parameter associated with said total travel path of said golf ball using at least one of said sensors in said plurality of sensors;
- determining, using said computer, whether the first sensor detects said second parameter associated with the total travel path;
- determining, using said computer, whether said second sensor detects the second parameter associated with the total travel path;
- evaluating, using said computer, both said first sensor and said second sensor to determine whether to use said first parameter or said second parameter when both said first parameter and said second parameter are available;
- calculating, using said computer, the total travel path of said golf ball using both the first parameter detected by the first sensor and the second parameter detected by the second sensor when both the first sensor and the second sensor detect the first parameter, but the first sensor does not detect the second parameter; and
- depicting on a display in electronic communication with said computer the calculated total travel path hit from said hitting station at said driving range.

19. The method of claim 18 wherein the method further comprises the step of determining whether a third sensor in the plurality of sensors detects a third parameter associated with the total travel path.

20. The method of claim 19, wherein a ground path is depicted using the third parameter.

21. The method of claim 20, wherein the third parameter is the velocity, speed, direction, friction or a combination thereof of the golf ball after an impact point.

22. The method of claim 18 wherein the first parameter comprises golf ball data, club data or a combination thereof.

23. The method of claim 22 wherein said golf ball data and said club data comprise club head path, club face angle, club head speed, golf ball launch angle, golf ball side spin, golf ball vertical spin, golf ball initial velocity or a combination thereof.

24. The method of claim 18 wherein the second parameter comprises shot trajectory data.

25. The method of claim 18 further comprising:
- said first sensor having a first field of detection, and said first field of detection having a substantially unobstructed view of said moment of impact of said golf ball; and
- said second sensor having said second sensor type that is different from said first sensor type and a second field of detection that is different from said first field of detection, and said second field of detection has a substantially unobstructed view of a flight path of said golf ball.

* * * * *